United States Patent
Schwendimann et al.

(10) Patent No.: US 8,333,917 B1
(45) Date of Patent: Dec. 18, 2012

(54) DRAWABLE AND MOLDABLE GEL-BASED ARTICLES

(75) Inventors: Jodi A. Schwendimann, Minnetonka Beach, MN (US); Scott Evanoff, Stillwater, MN (US)

(73) Assignee: NuCoat, Inc., Plymouth, MN (US)

( * ) Notice: Subject to any disclaimer, the term of this patent is extended or adjusted under 35 U.S.C. 154(b) by 451 days.

(21) Appl. No.: 12/556,312

(22) Filed: Sep. 9, 2009

Related U.S. Application Data

(60) Provisional application No. 61/234,048, filed on Aug. 14, 2009.

(51) Int. Cl.
*B29C 67/00* (2006.01)

(52) U.S. Cl. ........................... 264/308; 425/447

(58) Field of Classification Search ........... 425/DIG. 47, 425/447; 264/DIG. 60, 245, 308
See application file for complete search history.

(56) References Cited

U.S. PATENT DOCUMENTS

| | | | | |
|---|---|---|---|---|
| 2,974,373 | A * | 3/1961 | Luxenberger et al. | 264/46.6 |
| 3,539,673 | A * | 11/1970 | Poole et al. | 264/129 |
| 3,598,358 | A * | 8/1971 | Clearwaters et al. | 249/117 |
| 4,021,380 | A | 5/1977 | Nuttall | |
| 4,215,843 | A | 8/1980 | Gay et al. | |
| 4,637,907 | A | 1/1987 | Hegel et al. | |
| 4,693,800 | A * | 9/1987 | Edwards et al. | 528/482 |
| 4,735,660 | A | 4/1988 | Cane | |
| 4,738,647 | A | 4/1988 | Renger et al. | |
| 5,084,309 | A * | 1/1992 | Smith et al. | 428/29 |
| 5,133,683 | A | 7/1992 | Dorfman | |
| 5,165,337 | A | 11/1992 | Schlundt | |
| 5,236,269 | A | 8/1993 | Handy | |
| 5,258,068 | A | 11/1993 | Shapero et al. | |
| 5,273,476 | A | 12/1993 | Dorfman | |
| 5,308,636 | A | 5/1994 | Tye et al. | |
| 5,310,421 | A | 5/1994 | Shapero et al. | |
| 5,344,358 | A | 9/1994 | Jantzen | |
| 5,387,149 | A | 2/1995 | Caveza | |
| 5,451,745 | A | 9/1995 | Goldberg et al. | |
| 5,569,511 | A * | 10/1996 | Spector | 428/11 |
| 5,640,859 | A | 6/1997 | Fromm | |
| 5,873,933 | A | 2/1999 | Mackey | |
| 5,887,448 | A | 3/1999 | Gilbert et al. | |
| 5,990,205 | A | 11/1999 | Cordova | |
| 6,380,300 | B1 | 4/2002 | Cordova | |
| 6,387,169 | B1 | 5/2002 | Cordova | |
| 6,429,244 | B1 * | 8/2002 | Rinka et al. | 524/186 |
| 6,767,938 | B1 | 7/2004 | Cordova | |
| 6,838,537 | B2 | 1/2005 | Cordova | |
| 6,905,431 | B2 | 6/2005 | Pearce et al. | |
| 7,037,455 | B2 | 5/2006 | Marine | |
| 7,374,469 | B2 * | 5/2008 | Lin | 446/273 |
| 7,531,032 | B2 | 5/2009 | Cordova | |
| 2005/0000642 | A1 | 1/2005 | Everaerts et al. | |

* cited by examiner

*Primary Examiner* — Robert B Davis

(74) *Attorney, Agent, or Firm* — Schwegman Lundberg & Woessner, P.A.

(57) ABSTRACT

Various drawable and moldable gel-based articles, methods and kits are disclosed in this patent document. In some examples, the gel-based article includes a gel-clinging article, which is configured to adhere to smooth, rigid surfaces such as glass windows upon curing, without the use of adhesives or fasteners. In some examples, the gel-based article includes a molded article, such as a bouncy ball (commonly known as a "super-ball"), a fishing lure or other small figurine-type toys. In some examples, the gel-based article includes an edible gel-based article, such as a gummy worm or gummy bear. In various examples, the gel-based article is simple to use and capable of prompt curing. Advantageously, the present gel-based articles, methods and kits allow for stimulation of one's creativity and imagination, and subsequent display, use or consumption of a created product.

18 Claims, 5 Drawing Sheets

DRAWABLE AND MOLDABLE GEL-BASED ARTICLES

CLAIM OF PRIORITY

This non-provisional patent application claims the benefit of priority under 35 U.S.C. §119(e) to U.S. Provisional Patent Application Ser. No. 61/234,048, entitled "DRAWABLE AND MOLDABLE GEL-BASED ARTICLES," filed Aug. 14, 2009, the specification of which is herein incorporated by reference in its entirety.

TECHNICAL FIELD

This patent document pertains generally to art projects, decorations, toys and edible treats. More particularly, but not by way of limitation, this patent document pertains to drawable and moldable gel-based articles, methods and kits.

BACKGROUND

Artwork and the creation of artwork can be an important developmental tool. For example, coloring utensils including colored or tinted pigments, such as crayons, paints and markers, are often given to children for painting, drawing or other marking purposes in order to stimulate their creativity and imagination. As another example, in preparation for the pinewood derby (a racing event associated with the Boy Scouts of America), Cub Scouts, with the help of parents, build their own cars from a kit containing a block of pine, plastic wheels and metal axles. Through the creation of a car, a Cub Scout is able to stimulate his creativity and imagination regarding, for example, the design, color and decals, which the car will ultimately bear. Furthermore, the Cub Scout, via the pinewood derby event, is able to make use of his creation.

OVERVIEW

The present inventors have recognized, among other things, there is a need for gel-based art projects enabling children and adults to stimulate their creativity and imagination, and subsequently display, use or consume what they have created. The present inventors have further recognized that the art projects should be simple to use and capable of prompt curing for post-creation display, use or consumption.

Various drawable and moldable gel-based articles, methods and kits are disclosed in this patent document. In some examples, the gel-based article includes a gel-clinging article, which is configured to adhere to smooth, rigid surfaces such as glass windows upon curing, without the use of adhesives or fasteners. A method for making the gel-clinging article can include dispensing a gel substance of one or more colors on a substrate, such as a clear film including or allowing for the transparency of trace lines, or into a mold with one or more dispensing instruments and heating the substrate or mold and the gel substance at an elevated temperature sufficient to cure the substance. A kit for making the gel-clinging article can include a gel substance of one or many colors, one or more dispensing instruments or instrument tips, and a substrate or mold for receiving the dispensed gel substance. Optionally, the kit can further comprise a rigid tray for handling the substrate or mold and dispensed gel substance during processing, including transport and curing.

In some examples, the gel-based article includes a molded, gel-based article, such as a bouncy ball (commonly known as a "super-ball"), a fishing lure, or a small figurine-type toy. A method for making the molded, gel-based article can include dispensing a gel substance of one or more colors into a mold, such as a lightweight, inexpensive plastic mold, with one or more dispensing instruments and heating the mold and the gel substance at an elevated temperature sufficient to cure the gel substance. A kit for making the molded, gel-based article can include a gel substance of one or many colors, one or more dispensing instruments or instrument tips, and a mold for receiving the dispensed gel substance. Optionally, the kit can further comprise a rigid tray for handling the mold and dispensed gel substance during processing, including transport and curing.

In some examples, the gel-based article includes an edible, gel-based article, such as a gummy worm or gummy bear. A method for making the edible, gel-based article can include slightly warming or heating an edible gel substance sufficient to soften the substance, dispensing the substance on a substrate, such as a wax-coated film, or into a mold, and cooling the substance at a reduced temperature sufficient to cure the edible gel substance. A kit for making the edible, gel-based article can include an edible gel substance of one or many colors, one or more dispensing instruments or instrument tips, and a substrate or mold for receiving the dispensed edible gel substance. Optionally, the kit can further comprise a rigid tray for handling the substrate or mold and dispensed gel substance during processing, including transport and curing.

To better illustrate the present drawable and moldable gel-based articles, methods and kits, a non-limiting list of examples is provided here:

In Example 1, a method comprises dispensing a gel substance on or into at least one of a substrate or a cavity of a mold using a dispensing instrument, the gel substance including plastisol having a viscosity between about 30,000 centipoise to about 120,000 centipoise; heating the gel substance and the substrate or mold, sufficient to cure the gel substance; and forming a gel-based article.

In Example 2, the method of Example 1 is optionally configured such that forming the gel-based article includes forming a gel-clinging article, the gel-clinging article configured to adhere to a smooth, rigid surface upon curing, without the use of adhesive or fasteners.

In Example 3, the method of any one or any combination of Examples 1 or 2 is optionally configured such that forming the gel-based article includes forming a molded, gel-based article.

In Example 4, the method of any one or any combination of Examples 1-3 is optionally configured such that dispensing the gel substance includes writing or drawing on a substantially flat substrate.

In Example 5, the method of any one or any combination of Examples 1-4 is optionally configured such that heating the gel substance includes heating the gel substance above about 225° F.

In Example 6, the method of any one or any combination of Examples 1-5 is optionally configured such that heating the gel substance includes heating the gel substance for about 10 minutes or less.

In Example 7, the method of any one or any combination of Examples 1-6 is optionally configured such that the substrate comprises one of a pre-patterned sheet, an embossed or embedded sheet, a clear film or a non-stick sheet.

In Example 8, the method of any one or any combination of Examples 1-7 is optionally configured such that the mold comprises a shape of a fishing lure, a bouncy ball, an insect, a doll figurine, a toy soldier figurine, a toy automobile, a super hero or other active figure, a flower, a tree, or an animal.

In Example 9, a kit comprises a gel substance including plastisol having a viscosity between about 30,000 centipoise to about 120,000 centipoise; one or more dispensing instruments; and at least one of a substrate or a mold, having a cavity, for receiving the gel substance from the one or more dispensing instruments.

In Example 10, the kit of Example 9 is optionally configured such that the one or more dispensing instruments comprise a removable tip.

In Example 11, the kit of any one or any combination of Examples 9 or 10 optionally comprises a plurality of dispensing instrument tips, each tip differing in at least one of size or shape.

In Example 12, the kit of any one or any combination of Examples 9-11 optionally comprises one or more color additives for the gel substance.

In Example 13, the kit of any one or any combination of Examples 9-12 optionally comprises one or more decorative additives for the gel substance.

In Example 14, the kit of Example 13 is optionally configured such that the one or more decorative additives include at least one of glitter-like particles, neon or other fluorescent particles, glow-like particles, or a desired scent.

In Example 15, the kit of any one or any combination of Examples 9-14 is optionally configured such that the one or more dispensing instruments are pre-filled with the gel substance.

In Example 16, a kit comprises a gel substance including plastisol; one or more dispensing instruments; and at least one of a substrate or a mold, having a cavity, for receiving the gel substance from the one or more dispensing instruments, wherein the gel substance, upon curing, includes one or more clingy properties and is configured to adhere to surfaces without the use of adhesives or fasteners.

In Example 17, the kit of Example 16 is optionally configured such that the one or more dispensing instruments are pre-filled with the gel substance.

In Example 18, a method comprises heating an edible gel substance, sufficient to soften the substance; dispensing the edible gel substance on at least one of a substrate or into a cavity of a mold using a dispensing instrument; cooling the edible gel substance and the substrate or mold, sufficient to cure the edible gel substance; and forming an edible, gel-based article.

In Example 19, the method of Example 18 is optionally configured such that heating the edible gel substance includes heating at least two of gelatin, sweetener, or water.

In Example 20, the method of any one or any combination of Examples 18 or 19 is optionally configured such that dispensing the edible gel substance includes using a first dispensing instrument tip having a first size and shape, and using a second dispensing instrument tip having a second size and shape difference than the first size and shape.

In Example 21, the method of any one or any combination of Examples 18-20 is optionally configured such that dispensing the edible gel substance includes dispensing at least two colors of an edible gel substance.

In Example 22, the method of any one or any combination of Examples 18-21 is optionally configured such that heating the edible gel substance includes heating the edible gel substance to about 100° F. or more.

In Example 23, the method of any one or any combination of Examples 18-22 is optionally configured such that cooling the edible gel substance includes cooling the edible gel substance to less than about 40° F.

In Example 24, a kit comprises an edible gel substance including at least two of gelatin, sweetener, or water; one or more dispensing instruments; and at least one of a substrate or a mold, including a cavity, for receiving the edible gel substance from the one or more dispensing instruments.

In Example 25, the kit of Example 24 optionally comprises a plurality of dispensing instrument tips, each tip differing in at least one of size or shape.

In Example 26, the kit of any one or any combination of Examples 24 or 25 optionally comprises one or more color additives for the edible gel substance.

In Example 27, the kit of any one or any combination of Examples 24-26 optionally comprises one or more decorative additives for the edible gel substance.

In Example 28, the kit of any one or any combination of Examples 24-27 is optionally configured such that the one or more dispensing instruments are pre-filled with the edible gel substance.

In Example 29, the method or kit of any one or any combination of Examples 1-28 is optionally configured such that all elements or options recited are available to use or select from.

These and other examples and features of the present drawable and moldable gel-based articles, methods and kits will be set forth in part in the following Detailed Description. This Overview is intended to provide non-limiting examples of the present subject matter—it is not intended to provide an exclusive or exhaustive explanation of the present subject matter. The Detailed Description is included to provide further information about the drawable and moldable gel-based articles, methods and kits disclosed in the present patent document.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

In this patent document, various drawable and moldable gel-based articles, methods and kits are disclosed. The gel-based articles, methods and kits allow for near limitless user customization, easy to use procedures, and short cure times. Upon creation, the gel-based articles can be used as a piece of artwork, a toy, or as an edible treat. The gel-based articles can, in some examples, be formed on a substrate such as a film or be formed in a mold. The substrate and molds can be chosen such that they do not cross-link or otherwise chemically react with a received gel substance used to create the gel-based articles, providing easy removal of the substance from the substrate or mold.

Figure 1:
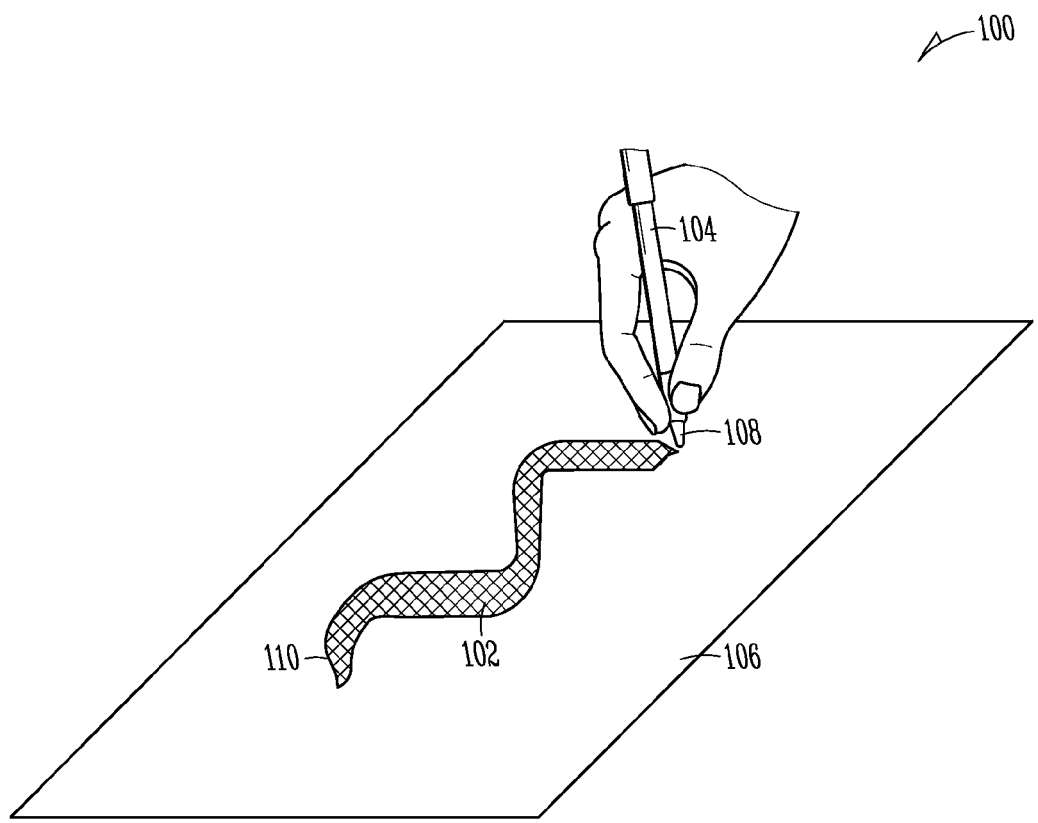
FIG. 1 illustrates a perspective view of an example of an uncured gel-based article, a dispensing instrument, and a substrate.

FIG. 1 illustrates a perspective view of a gel-based kit 100 including an uncured gel-based article 102, a dispensing instrument 104, and a substrate 106, according to at least one embodiment of the present subject matter. The uncured gel-based article 102 can be formed when a gel substance 110 is drawn, written or otherwise dispensed on a major surface of the substrate 106 using the dispensing instrument 104. The dispensing instrument 104 can take the form of a pen, a marker, a food decorating pen, a pastry bag or a striping bag, for example. The dispensing instrument 104 can further include an array of removable tips 108 depending on the use. The removable tips 108 allow for the use of dispensing openings of differing sizes and shapes.

After a user determines that the uncured gel-based article 102 achieves a desired look, the uncured article 102 can be cured using an elevated temperature, such as when the gel substance 110 includes a plastisol material, or a reduced temperature, such as when the gel substance 110 includes a gelatin material. In various examples, the plastisol material is a suspension of PVC particles in a plasticizer, which has a durometer of between about 60 to about 70 and/or a viscosity between about 30,000 centipoise (cP) to about 120,000 cP. In some examples, the viscosity of the plastisol material is between about 100,000 cP and 120,000 cP. This combination of materials can flow as a liquid and can be dispensed from the dispensing instrument 104 as desired by a user, without running or bleeding, to form the uncured gel-based article 102. When heated at an elevated temperature during curing (e.g., about 225° F. or more), the PVC plastic and plasticizer mutually dissolve each other. On cooling the plastisol material, a flexible, permanently plasticized gel-based article can result. In various examples, the gelatin material can include one or more of Jell-O powder mix, gelatin, sweetener, or liquid, such as water. Optionally, photo-chromatic or thermal-chromatic materials, that is materials that respectively change color by light and heat, can be used to produce the gel-based article 102.

Figure 2:
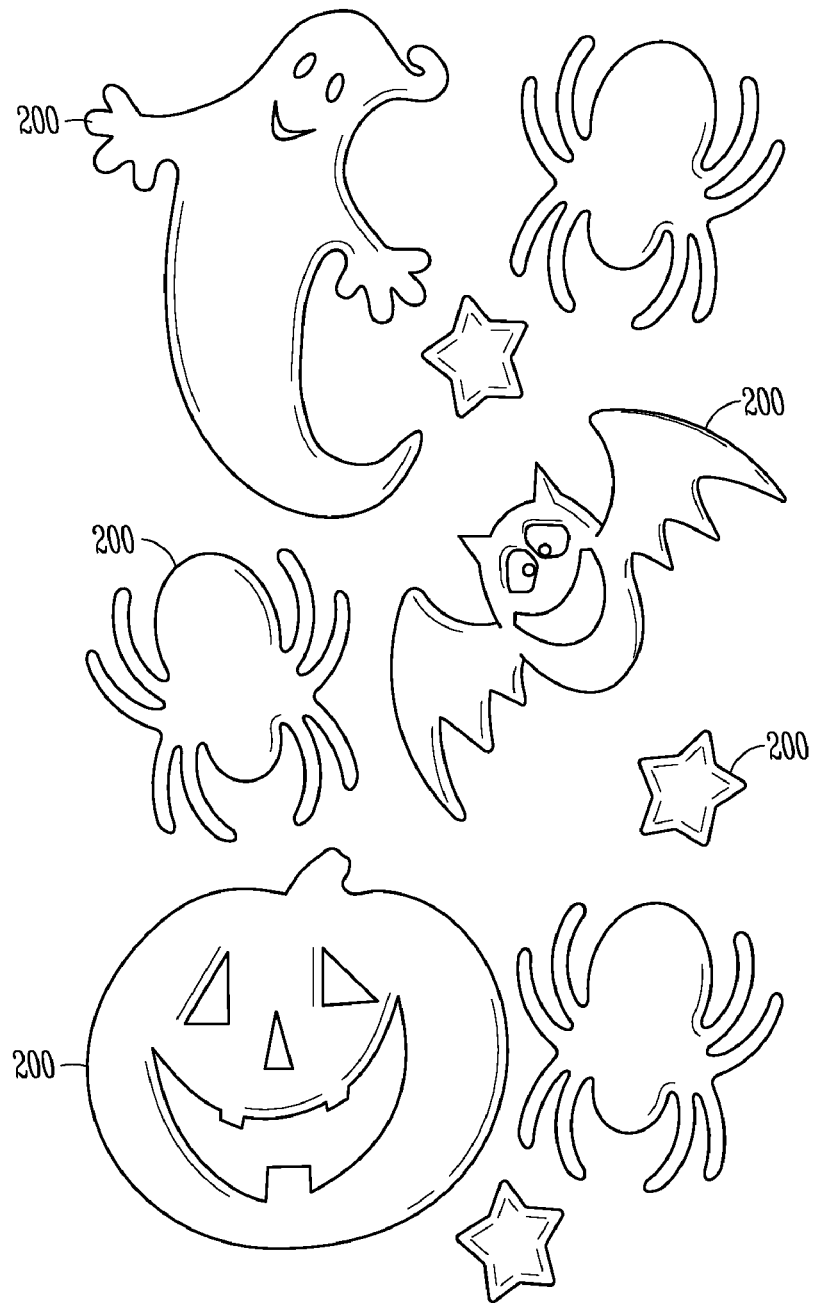
FIG. 2 illustrates an example of various sizes and shapes of gel-clinging articles.

In some examples, as shown in FIG. 2, a cured gel-based article includes a gel-clinging article 200 of one of various sizes and shapes. The gel-clinging article 200 is configured to adhere to smooth, rigid surfaces such as glass windows, without the use of adhesives or fasteners. A kit 100 for making the gel-clinging article 200 can include a gel substance 110, such as a plastisol material, of one or many colors, one or more dispensing instruments 104 or instrument tips 108, and a substrate 106, such as a clear film including or allowing for the transparency of trace lines, for receiving the dispensed gel substance 110. Optionally, the kit 100 can further comprise a rigid tray (e.g., a cookie sheet) for handling the substrate 106 and dispensed gel substance 110 during processing, including transport from a table to an oven and post-curing. In some examples, the rigid tray is used as the substrate for directly receiving the gel substance 110 and for transporting the gel substance 110 during processing. The kit 100 can also include one or more coloring or decorative additives for the gel substance 110.

In other examples, referring again to FIG. 1, the cured gel-based article includes an edible, gel-based article, such as a gummy worm. A kit 100 for making the edible, gel-based article can include an edible gel substance 110, such as a gelatin-containing material, of one or many colors, one or more dispensing instruments 104 or instrument tips 108, and a substrate 106, such as wax paper, for receiving the dispensed gel substance 110. Optionally, the kit 100 can further comprise a rigid tray for handling the substrate 106 and dispensed gel substance 110 during processing, including transport and curing. In some examples, the rigid tray is used as the substrate for directly receiving the gel substance 110 and for transporting the gel substance 110 during processing. The kit 100 can also include one or more coloring or decorative additives for the gel substance 110. Optionally, the edible, gel-based article can exhibit clingy properties allowing for adhesion to surfaces without the use of adhesives or fasteners.

Figure 3:
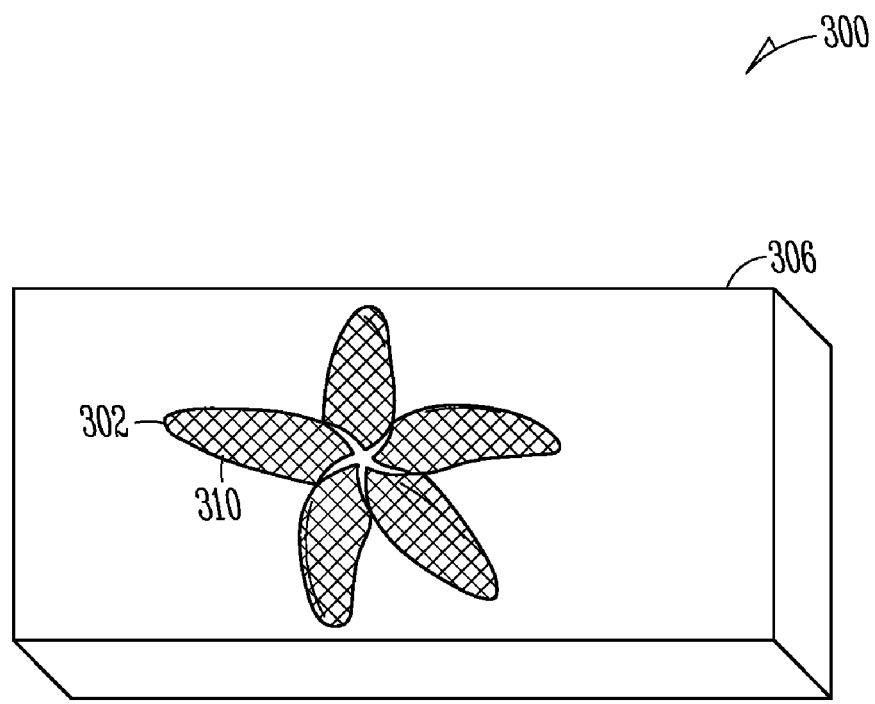
FIG. 3 illustrates an example of an uncured gel-based article within a cavity of a mold.

FIG. 3 illustrates a perspective view of portions of a gel-based kit 300 including an uncured gel-based article 302 and a mold 306 including one or more cavities, according to at least one embodiment of the present subject matter. The uncured gel-based article 302 can be formed when one or more cavity surfaces of the mold 306 come in contact with a dispensed gel substance 310. Upon being dispensed into a mold 306 cavity, the gel substance 310 can assume a pattern or shape of the mold 306 cavity. A dispensing instrument, such as a dispensing tube, can be used to dispense the gel substance 310 into the mold 306 cavity. In various examples, the pattern or shape of the mold 306 cavity includes, but is not limited to, a fishing lure, a bouncy ball, an insect, a doll figurine, a toy soldier figurine, a toy automobile, a super hero or other action figure, a flower, a tree, or an animal. The mold may be of a single or two-piece construction.

After filling the mold 306 cavity with the gel substance 310, the uncured article 302 can be cured using an elevated temperature, such as when the gel substance 310 includes a plastisol material, or a reduced temperature, such as when the gel substance 310 includes a gelatin material. In various examples, the plastisol material is a suspension of PVC particles in a plasticizer, which has a durometer of between about 60 to about 70 and/or a viscosity between about 30,000 centipoise (cP) to about 120,000 cP. In some examples, the viscosity of the plastisol material is between about 100,000 cP and 120,000 cP. In various examples, the gelatin material can include Jell-O powder mix, gelatin, or liquid such as water.

In some examples, a cured gel-based article includes a molded, gel-based article, which can be enjoyed during playtime activities. A kit 300 for making the molded, gel-based article can include a gel substance 310, such as a plastisol material, of one or many colors, one or more dispensing instruments or instrument tips, and a mold 306 for receiving the dispensed gel substance 310. Optionally, the kit 300 can further comprise a rigid tray (e.g., a cookie sheet) for handling the mold 306 and dispensed gel substance 310 during processing, including transport and curing. The kit 300 can also include one or more coloring or decorative additives for the gel substance 310.

In other examples, the cured gel-based article 302 includes a molded, edible gel-based article, such as a gummy bear. A kit 300 for making the molded, edible gel-based article can include an edible gel substance 310, such as a gelatin-based material, of one or many colors, one or more dispensing instruments or instrument tips, and a mold 306 for receiving the dispensed edible gel substance 310. Optionally, the kit 300 can further comprise a rigid tray for handling the mold 306 and dispensed gel substance 310 during processing, including transport and curing. The kit 300 can also include one or more coloring or decorative additives for the gel substance 310.

Figure 4:
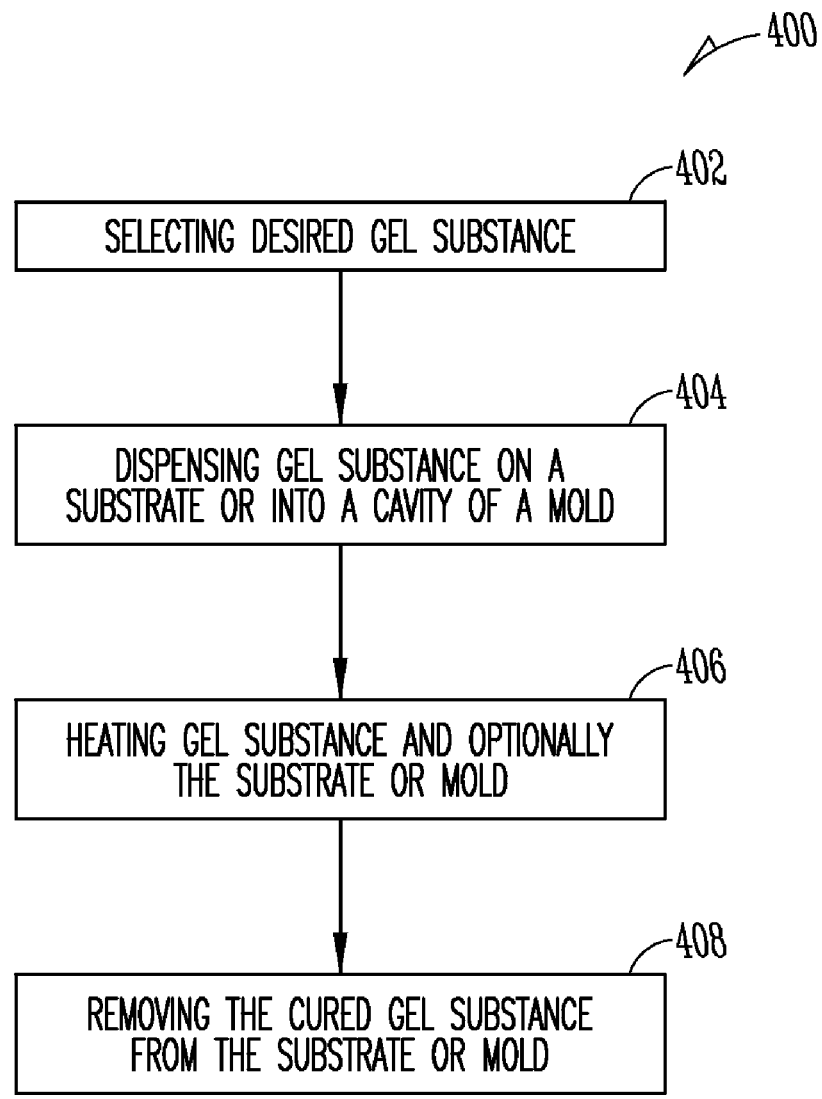
FIG. 4 illustrates an example method of making a gel-clinging article or a molded, gel-based article.

FIG. 4 illustrates a method 400 of making a gel-clinging article or a molded, gel-based article, according to at least one embodiment of the present subject matter. At 402, a gel substance of a chosen color or having another desirable characteristic (e.g., including glitter-like particles, neon or other fluorescent particles, glow-like particles, or a desired scent) is selected. The gel substance can be a plastisol material, for example.

At 404, the gel substance is dispensed on a substrate or into a cavity of a mold. Dispensing can occur through the use of a dispensing instrument. Prior to dispensing, the dispensing instrument can be filled or otherwise contacted with the chosen gel substance. The substrate can include a pre-patterned sheet, an embossed or embedded sheet, a clear film or a non-stick sheet, for example. Dispensing can include dispensing substantially along a pattern on a pre-patterned sheet or within an embossed section of the substrate. A user can also create his/her own customized pattern, design or shape by dispensing the gel substance as desired on the substrate. This pattern may be a "free-hand" design. Dispensing can alternatively include dispensing into the cavity of a mold. If using a mold, the mold may be of a single or two-piece construction.

At 406, the gel substance and optionally the substrate or mold on or into which the substance was dispensed are heated at an elevated temperature, sufficient to cure the substance and form the gel-clinging article or the molded, gel-based article. When heated to a certain temperature, such as above about 225° F., the PVC plastic and plasticizer mutually dissolve each other. In some examples, the gel substance and the substrate or mold are heated to about 400° F. or more for faster curing. On cooling the gel substance, such as to a temperature below about 140° F., a flexible, permanently plasticized product can result. Curing may be done with a flash dryer, or more inexpensively and conveniently, a home oven. Some plastisol materials can be heated to reach a temperature of about 350° F. for full curing. The gel substance can be heated above about 200° F., above about 300° F. or above about 350° F., for example. Depending upon the gel material being used, heating may occur in periods from about 1 minute to about 10 minutes, such as about 1-2 minutes, about 1-3 minutes, about 2-3 minutes, about 3-5 minutes, or about 4-10 minutes.

At 408, the cured gel substance is removed from the substrate or mold to form the gel-clinging article or the molded, gel-based article. This may be facilitated by the substrate or mold having non-stick surfaces and/or the gel substance configured to not chemically or physically interact with the substrate or mold. The cured gel-clinging article or the molded, gel-based article having the desired pattern or shape can then be placed on a smooth surface, such as a window, door, wall, table, countertop, desk, metal surface or ceiling, for decoration and viewing, or can be used during play-time activities.

Figure 5:
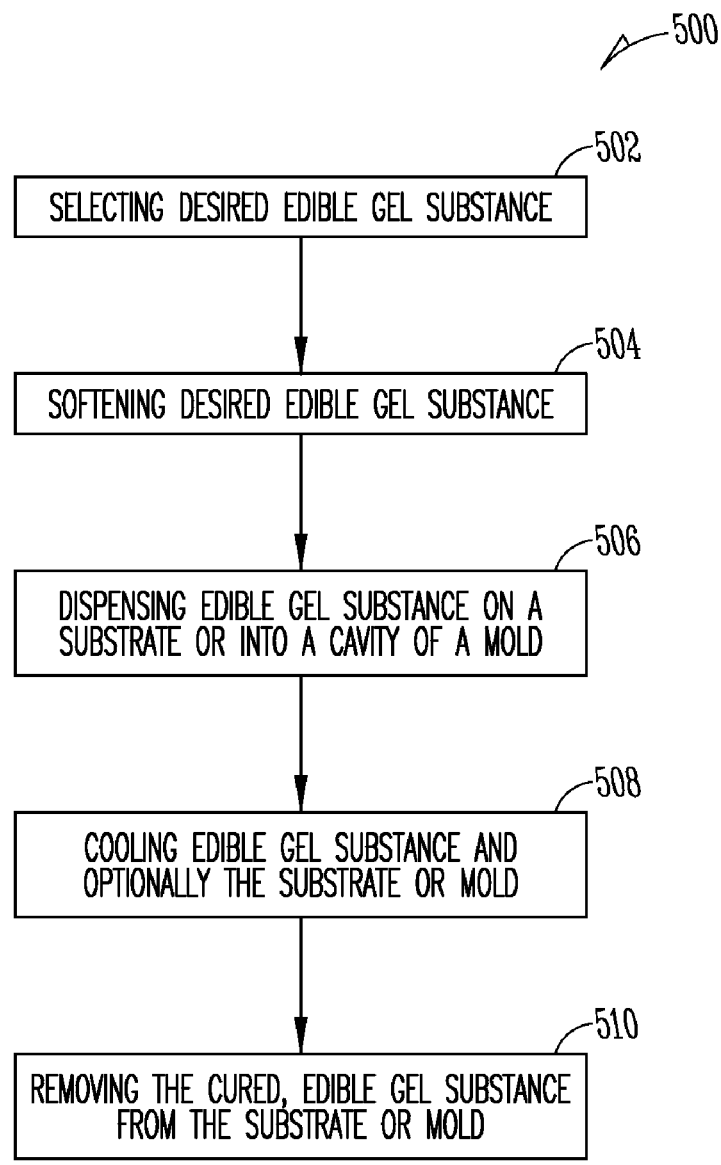
FIG. 5 illustrates an example method of making an edible, gel-based article.

FIG. 5 illustrates a method 500 of making an edible, gel-based article, according to at least one embodiment of the present subject matter. At 502, an edible gel substance of a chosen color or having another desirable characteristic is selected. The gel substance can be a gelatin-based material or a material including gelatin, for example.

At 504, the edible gel substance is heated at temperature and for a time sufficient to soften the substance. The edible gel substance can, for example, be placed in a dispensing instrument and heated prior to use to soften the substance. Heating can include placing the instrument or other container in warm or hot water. Heating can include heating above about 75° F., above about 85° F., above about 95° F. or above about 100° F., such as about 120° F.

At 506, the edible gel substance is dispensed on a substrate or into a cavity of a mold. Dispensing can occur through the use of a dispensing instrument. Prior to dispensing, the dispensing instrument can be filled or otherwise contacted with the edible gel substance. The substrate can include a pre-patterned sheet, an embossed or embedded sheet, a clear film or a non-stick sheet. Dispensing can include dispensing substantially along a pattern on a pre-patterned sheet or within an embossed section of the substrate. A user can also create his/her customized pattern, design or shape by dispensing the edible gel substance as desired on the substrate. This pattern may be a "free-hand" design. Dispensing can alternatively include dispensing into the cavity of a mold. If using a mold, the mold may be of a single or two-piece construction.

At 508, the edible gel substance and optionally the substrate or mold on or into which the substance was dispensed are cooled at a reduced temperature, sufficient to cure the edible substance and form the edible, gel-based article. When cooling to a certain temperature, such as below about 40° F., the edible gel substance sets or hardens. In some examples, the edible gel substance and the substrate or mold are cooled to about 10° F. or less for faster curing. Curing may be done in a refrigerator or freezer. Some edible gel substances can be cooled to a temperature of about 20° F. for full curing. The edible gel substance can be cooled below about 40° F., below about 30° F., below about 20° F., below about 10° F., below about 5° F. or between about 0° F. to about 3° F., for example. Cooling can occur over about 5-10 minutes, about 10-15 minutes, about 15-20 minutes, about 20-25 minutes, or above about 30 minutes, for example.

At 510, the cured, edible gel substance is removed from the substrate or mold to form the edible, gel-based article. This may be facilitated by the substrate or mold having non-stick surfaces and/or the edible gel substance configured to not chemically or physically interact with the substrate or mold. The edible, gel-based article having the desired pattern or shape can then be placed on a surface or consumed. Optionally, the edible, gel-based article can be configured (e.g., by differing concentration amount of gelatin) to exhibit clingy properties allowing for adhesion to surfaces without the use of adhesives or fasteners.

As disclosed above, a retail kit can also be packaged for consumer purchase. The kit can include a dispensing instrument, an edible gel substance and a substrate or mold. The kit may also include one or more coloring or decorative additives for the edible gel substance. The dispensing instrument may be packaged with a variety of removable tips for the user to customize the size and shape of the output of the instrument.

Closing Notes:

Various drawable and moldable gel-based articles, methods and kits are disclosed in this patent document. The gel-based articles, methods and kits advantageously allow for near limitless user customization (e.g., make one's gel-clinging article, molded article, or treat), easy to use procedures, and short cure times. Upon creation, the gel-based articles can be used as a piece of artwork, a toy, or as an edible treat. The gel-based articles can, in some examples, be formed on a substrate such as a film or be formed in a mold. The substrate and molds can be chosen such that they do not cross-link or otherwise chemically react with a received gel substance used to create the gel-based articles, providing easy removal from the substrate or mold.

Retail kits packaged for consumer purchase can include a dispensing instrument, gel substance, and a substrate, such as a patterned sheet, or a mold. The kit can also include coloring additives, decorative additives, or gel substances having a pre-mixed array of colors and decorative effects. The dispensing instrument can be packaged with a variety of removable tips for the user to customize the size and shape of the instrument's dispensing output.

The above Detailed Description includes references to the accompanying drawings, which form a part of the Detailed Description. The drawings show, by way of illustration, specific embodiments in which the invention can be practiced. These embodiments are also referred to herein as "examples." Equivalent materials to those disclosed herein may be substituted and utilized in the present articles, methods and kits without departing from the scope of the subject matter.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, references to "an," "one," or "various" embodiments are not necessarily to the same embodiment, and such references contemplate more than one embodiment. In this document, "gel substance" refers to a substance that may be moldable, drawable or flexible and is capable of curing. The following detailed description is, therefore, not to be taken in a limiting sense, and the scope is defined only by the appended claims, along with the full scope of legal equivalents to which such claims are entitled.

In the appended claims, the terms "including" and "in which" are used as the plain-English equivalents of the respective terms "comprising" and "wherein." Also, in the following claims, the terms "including" and "comprising" are open-ended, that is, a system, assembly, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

What is claimed is:

1. A method comprising:
dispensing a gel substance on or into at least one of a substrate or a cavity of a mold using a dispensing instrument, the gel substance including plastisol having a viscosity between about 30,000 centipoise to about 120,000 centipoise;
heating the gel substance and the substrate or mold, sufficient to cure the gel substance; and
forming a gel-clinging article, the gel-based article being configured to cling to a surface upon curing, without the use of adhesive or fasteners.

2. The method of claim 1, wherein forming the gel-clinging article includes forming a molded, gel-clinging article.

3. The method of claim 1, wherein dispensing the gel substance includes writing or drawing on a substantially flat substrate.

4. The method of claim 1, wherein heating the gel substance includes heating the gel substance above about 225° F.

5. The method of claim 1, wherein heating the gel substance includes heating the gel substance for about 10 minutes or less.

6. The method of claim 1, wherein the substrate comprises one of a pre-patterned sheet, an embossed or embedded sheet, a clear film or a non-stick sheet.

7. A kit comprising:
a gel substance including plastisol having a viscosity between about 30,000 centipoise to about 120,000 centipoise;
wherein the gel substance, upon curing, comprises a gel-clinging substance capable of clinging to a surface without the use of adhesives of fasteners;
one or more dispensing instruments; and
at least one of a substrate or a mold, having a cavity, for receiving the gel substance from the one or more dispensing instruments.

8. The kit of claim 7, wherein the one or more dispensing instruments comprise a removable tip.

9. The kit of claim 7, comprising one or more color additives for the gel substance.

10. The kit of claim 7, comprising one or more decorative additives for the gel substance.

11. The kit of claim 10, wherein the one or more decorative additives include at least one of glitter-like particles, neon or other fluorescent particles, glow-like particles, or a desired scent.

12. The kit of claim 7, wherein the one or more dispensing instruments are pre-filled with the gel substance.

13. A kit comprising:
a gel substance including plastisol;
one or more dispensing instruments; and
at least one of a substrate or a mold, having a cavity, for receiving the gel substance from the one or more dispensing instruments,
wherein the gel substance, upon curing, comprises a gel-clinging substance having one or more clingy properties that is capable of clinging to a surface without the use of adhesives or fasteners.

14. The kit of claim 13, wherein the one or more dispensing instruments are pre-filled with the gel substance.

15. The method of claim 1, wherein the plastisol of the gel substance has a durometer from about 60 to about 70.

16. The kit of claim 7, wherein the plastisol of the gel substance has a durometer from about 60 to about 70.

17. The kit of claim 13, wherein the plastisol of the gel substance has a viscosity from about 30,000 centipoise to about 120,000 centipoise.

18. The kit of claim 13, wherein the plastisol of the gel substance has a durometer from about 60 to about 70.

* * * * *